Sept. 23, 1969     D. G. HATCHARD     3,469,052
HEATING APPARATUS FOR METAL WORKPIECES
Filed Sept. 1, 1967
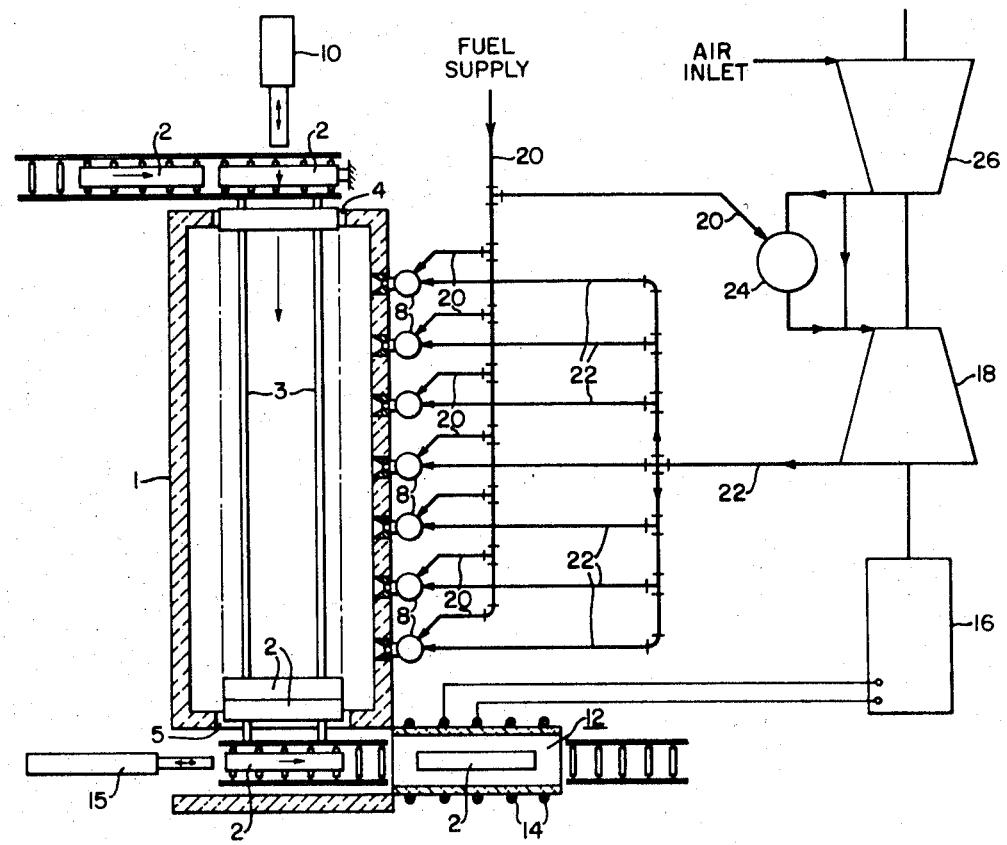
WITNESSES
Theodore F. Wrobel
James F. Young
INVENTOR
Donald G. Hatchard
BY
AGENT __United States Patent Office__  3,469,052
Patented Sept. 23, 1969

3,469,052
HEATING APPARATUS FOR METAL WORKPIECES
Donald G. Hatchard, Arnold, Md., assignor to Westinghouse Electric Corporation, Pittsburgh, Pa., a corporation of Pennsylvania
Filed Sept. 1, 1967, Ser. No. 665,013
Int. Cl. H05b 5/02
U.S. Cl. 219—10.47                                         4 Claims

ABSTRACT OF THE DISCLOSURE

Improvement in heating apparatus in which a metal workpiece is heat treated by subjection consecutively to the heating effect of a fuel-fired radiant furnace means and an electrical induction heating means. A gas turbine means drives a generator of A.C. power for energizing the induction heating means, and high temperature air-rich exhaust gas from the turbine means is fed to the burners of the radiant furnace means to support the combustion of fuel. The gas turbine and the radiant furnace employ the same type fuel and share a common source.

BACKGROUND OF THE INVENTION

Field of the invention

Apparatus for heating steel strips, slabs, billets, etc., which includes a fuel fired radiant furnace means and an electrical induction heating means.

Description of the prior art

Use of induction heating in conjunction with a gas fired radiant furnace has been proposed heretofore in connection with heating steel workpieces to afford such as higher speed operation of the furnace, more rapid control of the workpiece temperature, better regulation of the temperature profile in thicker workpieces, a shorter furnace, etc. In cases where commercial power is relatively expensive as compared to the cost of furnace fuel, there has been a reluctance to employ such supplemental induction heating in spite of the benefits derived from it.

SUMMARY

The present invention further enhances the value of the combination of induction heating means in supplement to a gas-fired radiant furnace, by the employment of a gas turbine means and generator for the induction heating power which operates from the same fuel source as that for the furnace burners and which exhausts high temperature air-rich gas to such burners for support of fuel combustion while conserving the heat present in such exhaust gas.

BRIEF DESCRIPTION OF THE DRAWING

The single figure is a schematic representation of the system of the present invention for heating steel workpieces.

DESCRIPTION OF THE PREFERRED EMBODIMENT

Referring to the drawing, the system of the present invention comprises a fuel-fired radiant furnace 1 for heating metal workpieces 2, which, as illustrated may be steel bars, billets, or slabs to be heated up to rolling temperature, or such workpiece may be continuous in the form of steel strip to be annealed or heat treated. In the exemplified case, the furnace 1 is horizontal and includes skid rails 3 to support the workpieces for sliding travel sidewise through the furnace from the entrance 4 to exit 5. In the case of a continuous steel strip (not shown), the furnace is usually vertical and includes guide rolls (not shown) for directing the strip continuously along a multiple pass route. Burners 8 direct hot gases into the furnace for heating the steel workpieces 2. A pusher means 10 may be employed to shove a cold workpiece through the entrance 4 and a hot workpiece out the exit 5.

In supplement to the furnace 1 is an induction heating means 12 having an induction coil 14 into which the heated workpiece 2 exiting the furnace 1 is moved for additional heating. A pusher means 15 may be employed for effecting such latter movement.

In accord with the present invention, the induction heating coil 14 is energized with alternating current of a suitable frequency produced by a generator 16 driven by a gas turbine 18 operated on fuel from a fuel supply line 20 which also delivers fuel to the burners 8 of the furnace 1. Hot exhaust gas from the turbine 18 is fed via gas lines 22 to the burners 8 for support of combustion of the fuel therein. The usual combustion chamber 24 generates the hot gas for operating the gas turbine which in turn drives the usual rotary compressor 26 that furnishes combustion air for stoichiometric combustion of fuel in the combustion chamber as well as a considerable excess of such amount which is mixed, for cooling with the hot combustion-chamber-generated gas prior to its introduction into the gas turbine 18 and which accounts for the high air content of exhaust gas from such turbine. The usual exhaust gas from a gas turbine is at a temperature of 800° F. to 900° F. with an air content in excess of 90% so that, in accord with the present invention, when this is fed to the radiant furnace via the lines 22 and the fuel burners 8 to support combustion of fuel from lines 20, the burning of such fuel need only raise the incoming gaseous media delivered to the furnace above the gas turbine exhaust gas temperature to the desired furnace temperature, thereby conserving fuel at the furnace and increasing efficiency of furnace operation. The system of the present invention can be used either to reduce the size and overall operating cost of a heating line at a given rate of production and/or to increase the capacity of an existent furnace line.

In the case of heating steel workpieces preparatory to rolling, a final workpiece temperature in the range of 2100° F. to 2300° F. is usually selected. Where the heating is for other purposes, such as in annealing tinplate strip, for example, final workpiece temperature in the vicinity of 1400° F. usually is more suitable.

I claim as my invention:

1. Heating apparatus for a metal workpiece comprising:
    (a) a fuel-fired radiant furnace (1) having fuel burners (8) for heating the interior thereof and through which a workpiece (2) is passed for heating;
    (b) induction heating means (12) through which such workpiece (2) is also passed for supplemental heating inductively;
    (c) alternating current generator means (16) for generating current to energize the induction heating means (12);
    (d) gas turbine means (18, 24, 26) driving the generator means and operating to have a hot air-rich exhaust;
    (e) a common fuel supply line connected to both the fuel burners of the radiant furnace and to the gas turbine means; and
    (f) duct means (22) conveying hot air-rich exhaust gas from the turbine means to the fuel burners of the radiant furnace for support of combustion of fuel therein and thereafter entrance into such furnace.

2. The heating apparatus of claim 1, wherein the induction heating means follows the radiant furnace means.

3. The heating apparatus of claim 1, wherein the gas turbine means comprises a gas turbine (18), a combustion chamber (24) delivering its output into the gas turbine, and an air compressor (26) operated by the turbine and supplying compressed air to the combustion chamber for supporting burning of the fuel therein and to the hot gas created in the combustion chamber for cooling prior to entrance into the gas turbine.

4. The heating apparatus of claim 1, so constructed and arranged as to provide a turbine exhaust gas at in excess of 800° F. and 90% air.

References Cited

UNITED STATES PATENTS

| | | | |
|---|---|---|---|
| 2,504,440 | 4/1950 | Miess | 219—10.47 X |
| 2,576,519 | 11/1951 | Kopp | 219—10.47 X |
| 2,604,755 | 7/1952 | Nordström et al. | |
| 3,374,621 | 3/1968 | Pacault et al. | |

JOSEPH V. TRUHE, Primary Examiner

L. H. BENDER, Assistant Examiner

U.S. Cl. X.R.

219—10.71